United States Patent [19]
Scott

[11] 3,908,222
[45] Sept. 30, 1975

[54] WINDSHIELD WIPER SAVERS
[76] Inventor: Gordon Robert Scott, 2568 S. Delaware St., Denver, Colo. 12699
[22] Filed: Mar. 25, 1974
[21] Appl. No.: 454,111

[52] U.S. Cl............................... 15/250; 15/250.19
[51] Int. Cl.² ........................................... B60S 1/02
[58] Field of Search........... 15/250, 250.36, 250.16, 15/250.17, 250.19

[56] References Cited
UNITED STATES PATENTS
2,974,340   3/1961   Kopczynski........................... 15/250

*Primary Examiner*—Peter Feldman
*Attorney, Agent, or Firm*—Enloe Wilkinson

[57] ABSTRACT

A simple but highly effective device, providing positive and continuous cleaning of the automobile windshield, and simultaneously extending the life potential of the wiper blades, is herein disclosed.

The windshield wiper savers consist solely of a number of small diamond shaped units of a pre-determined thickness, which are permanently attached to the windshield glass of the automobile in a horizontal line, just below and parallel to the wiper blade when in it's down or "off" position, their spacing and quantity per blade being variable in order to fit all lengths and thicknesses of wiper blades.

The continuous flexing action imparted to the rubber blades as they pass over the series of saver units, serves to free them of ice, snow, mud, dirt and other foreign particles, and to extend the useful service period of the blades.

1 Claim, 2 Drawing Figures

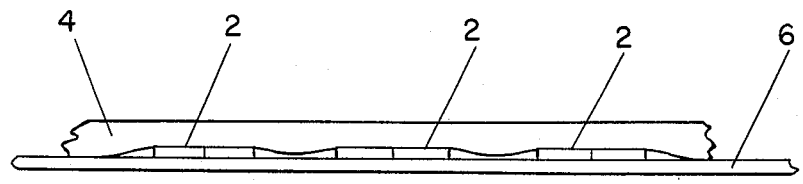
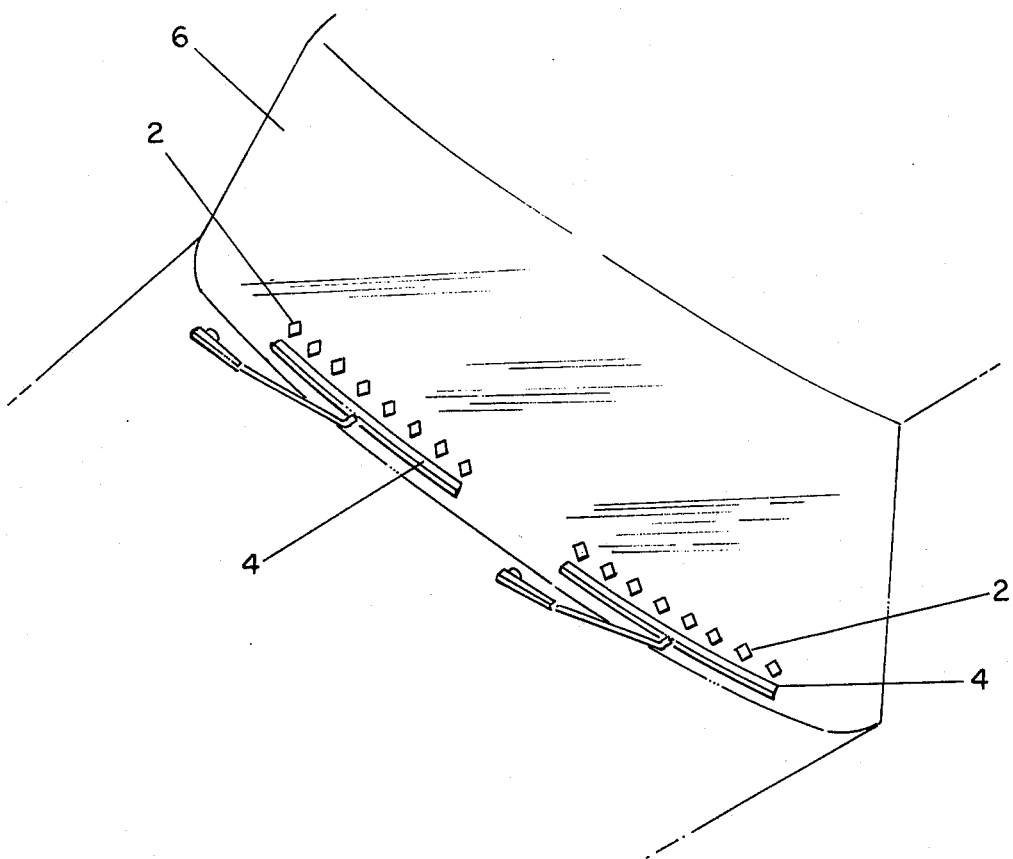

WINDSHIELD WIPER SAVERS

BACKGROUND OF THE INVENTION

The inventor, having tried many sizes, shapes and thicknesses of the basic saver unit in conjunction with differing types and sizes of windshield wiper blades, developed over a ten-month testing period, the current size and shape of unit, proving most effective as to it's inherent design and functional capability.

OBJECTS OF THE PRESENT INVENTION

The primary object of the present invention is the positive and effective manner in which the wiper blades maintain a constant, clear vision area of the windshield by being systematically cleared of all foreign objects as they pass over the saver units, thus allowing maximum driver visibility and greatly reducing the occurrence of ice build-up on the blades during freezing weather.

A secondary object of the invention is the extension of service-ability of the wiper blades, by means of the afore-mentioned "flexing" action imparted by the row of saver units.

BRIEF DESCRIPTION OF THE DRAWING

FIG. 1 is a three-dimensional illustration of the wiper saver units as installed on a typical automobile, and FIG. 2 is an orthographic enlarged section of the saver units, showing their relationship to the wiper blades and the windshield glass.

DETAILED DESCRIPTION

The device, as shown in accord with the concept of the invention disclosure, is described as follow:

FIG. 1 shows the respective placement of the saver units (reference numeral 2) in conjunction to the wiper blades (reference numeral 4) — the location is such that the row on units is placed parallel to and slightly above the wiper blade when it is in the down or "off" position, the point on each unit is in a vertical position to allow the rubber edge of the wiper blade to flex and be spread as it moves upward along the widening surface of the diamond-shaped unit.

FIG. 2 shows an edge-on view of the saver units, illustrating the flexing action of the rubber blade as it passes over the units with each sweep of the blade arc.

The saver units may be fabricated from a durable plastic or glass, and are permanently bonded to the windshield glass.

As the location designated for the saver units is below the driver's line of vision with the road, their placement offers no sight impedance or distraction influence.

What is claimed for the present invention is:

1. In combination with a transparent panel and a flexible wiper blade mounted for oscillating movement in contact with the outer surface of the panel, a plurality of spaced, independent units permanently mounted on the outer surface of said panel, said units being positioned parallel to each other in a row and located within the extreme points of the oscillation of said wiper blade for causing the edge of said wiper blade to flex as said blade passes thereover to remove ice, snow, and dirt therefrom, said units being diamond shaped and having opposite points thereof pointed in the direction of oscillation of the wiper blade.

* * * * *